US012689173B2

(12) United States Patent (10) Patent No.: US 12,689,173 B2
Pierrot et al. (45) Date of Patent: Jul. 21, 2026

(54) TUNABLE TERAHERTZ BURST MODE FOR PULSED LASER

(71) Applicant: Lumentum Operations LLC, San Jose, CA (US)

(72) Inventors: Simonette Pierrot, Dietikon (CH); Andreas Oehler, Zurich (CH); Felix Brunner, Zurich (CH); Benedikt Hermann, Schlieren (CH)

(73) Assignee: Lumentum Operations LLC, San Jose, CA (US)

( * ) Notice: Subject to any disclaimer, the term of this patent is extended or adjusted under 35 U.S.C. 154(b) by 479 days.

(21) Appl. No.: 18/478,387

(22) Filed: Sep. 29, 2023

(65) Prior Publication Data

US 2025/0007234 A1 Jan. 2, 2025

Related U.S. Application Data

(60) Provisional application No. 63/510,845, filed on Jun. 28, 2023.

(51) Int. Cl.
*H01S 3/105* (2006.01)
*G02B 27/10* (2006.01)
(Continued)

(52) U.S. Cl.
CPC ............ *H01S 3/105* (2013.01); *G02B 27/106* (2013.01); *H01S 3/06754* (2013.01);
(Continued)

(58) Field of Classification Search
CPC ................. H01S 3/105; H01S 3/06754; H01S 3/094003; H01S 3/11; H01S 2302/02; G02B 27/106
(Continued)

(56) References Cited

U.S. PATENT DOCUMENTS

2015/0104179 A1* 4/2015 Wang .................. H04J 14/0282
398/81
2016/0111849 A1* 4/2016 Shin ...................... H01S 5/0608
372/38.03
2023/0367134 A1* 11/2023 Seesselberg ......... B23K 26/064

OTHER PUBLICATIONS

Caterina Gaudiuso, et al.; "Laser ablation of silicon with THz bursts of femtosecond pulses"; Scientific Reports; Nature Portfolio; 2021; 11 pages; www.nature.com/scientificreports/.
(Continued)

*Primary Examiner* — Daniel A Hess

(74) *Attorney, Agent, or Firm* — Harrity & Harrity, LLP

(57) ABSTRACT

A tunable pulsed burst mode laser includes a beam splitting optical element; a plurality of optical path difference (OPD) tuning elements; a plurality of optical amplifiers; and a beam combining optical element. The beam splitting optical element is configured to split an input beam into a plurality of beams that are to propagate via a plurality of optical paths. The plurality of OPD tuning elements are configured to modify respective lengths of the plurality of optical paths. The plurality of optical amplifiers are configured to amplify respective optical powers of the plurality of beams. The beam combining optical element is configured to combine the plurality of beams into an output beam that comprises a plurality of pulsed beams, wherein a particular pulsed beam includes a plurality of beamlets that are respectively from the plurality of beams, and wherein the plurality of beamlets are provided in a terahertz (THz) burst.

20 Claims, 14 Drawing Sheets

(51) Int. Cl.
    *H01S 3/067*          (2006.01)
    *H01S 3/094*          (2006.01)
    *H01S 3/11*            (2023.01)

(52) U.S. Cl.
    CPC .......... *H01S 3/094003* (2013.01); *H01S 3/11*
               (2013.01); *H01S 2302/02* (2013.01)

(58) Field of Classification Search
    USPC ........................................................ 359/345
    See application file for complete search history.

(56)                   References Cited

OTHER PUBLICATIONS

Andong Wang, et al.; "Burst mode enabled ultrafast laser inscription inside gallium arsenide"; International Journal of Extreme Manufacturing; 2022; vol. 4; IOP Publishing LTD on behalf of the IMMT; 10 pages.

Gediminas Raciukaitis, "Perspectives in USP-Laser Processing", Fiziniu IR Rechnologijos Mokslu Centras; 7th UKP Workshop: Ultrafast Laser Technology, 42 pages.

"Discrete Piezoelectric Stacks 5.2 $\mu$m to 100.0 $\mu$m Travel"; 8 pages; Thorlabs, Inc.; retrieved from internet on Sep. 29, 2023; https://www.thorlabs.com/newgrouppage9.cfm?objectgroup_id=8040.

* cited by examiner

200

206-1

206-2

206-3

200

212-1

212-2

212-3

212-4

212-5

302-3
302-6
302-9

302-2
302-5
302-8

302-1
302-4
302-7

300

400

TUNABLE TERAHERTZ BURST MODE FOR PULSED LASER

CROSS-REFERENCE TO RELATED APPLICATION

This Patent Application claims priority to U.S. Provisional Patent Application No. 63/510,845, filed on Jun. 28, 2023, and entitled "Terahertz (THz) Adjustable Burst for Pulsed Lasers." The disclosure of the prior Application is considered part of and is incorporated by reference into this Patent Application.

TECHNICAL FIELD

The present disclosure relates generally to a pulsed laser and to a tunable terahertz (THz) burst mode for a pulsed laser.

BACKGROUND

For ultrashort-pulse (USP) lasers, such as those used for materials processing, a common operation mode is a so called "burst mode." In burst mode, a group of pulses, closely spaced in time, is emitted (typically on a regular frequency/scheme). A temporal spacing between each pulse of the group of pulses inside the burst can be smaller than a temporal spacing between groups of pulses.

SUMMARY

In some implementations, a tunable pulsed burst mode laser includes a beam splitting optical element; a plurality of optical path difference (OPD) tuning elements; a plurality of optical amplifiers; and a beam combining optical element, wherein: the beam splitting optical element is configured to split an input beam into a plurality of beams that are to propagate from the beam splitting optical element to the beam combining optical element via a plurality of optical paths, the plurality of OPD tuning elements are respectively disposed on the plurality of optical paths and are configured to modify respective lengths of the plurality of optical paths, the plurality of optical amplifiers are respectively disposed on the plurality of optical paths and are configured to amplify respective optical powers of the plurality of beams, and the beam combining optical element is configured to combine the plurality of beams into an output beam that comprises a plurality of pulsed beams, wherein a particular pulsed beam, of the plurality of pulsed beams, includes a plurality of beamlets that are respectively from the plurality of beams, and wherein the plurality of beamlets are provided in a terahertz (THz) burst.

In some implementations, a tunable pulsed burst mode laser includes a beam splitting optical element; a plurality of OPD tuning elements; and a beam combining optical element, wherein: the beam splitting optical element is configured to split an input beam into a plurality of beams that are to propagate from the beam splitting optical element to the beam combining optical element via a plurality of optical paths, the plurality of OPD tuning elements are respectively disposed on the plurality of optical paths, and the beam combining optical element is configured to combine the plurality of beams into an output beam that comprises a pulsed beam that includes a plurality of beamlets that are respectively from the plurality of beams, wherein the plurality of beamlets are provided in a burst, and wherein an amount time between consecutive beamlets within the burst is less than or equal to 1 picosecond (ps).

In some implementations, a tunable pulsed burst mode laser includes a beam splitting optical element; a plurality of OPD tuning elements; and a beam combining optical element, wherein: the beam splitting optical element is configured to split an input beam into a plurality of beams, the plurality of OPD tuning elements are respectively disposed on a plurality of optical paths of the plurality of beams, and the beam combining optical element is configured to combine the plurality of beams into an output beam that comprises a pulsed beam that includes a plurality of beamlets, and wherein the plurality of beamlets are provided in a tunable THz burst.

DETAILED DESCRIPTION

Figure 1A:
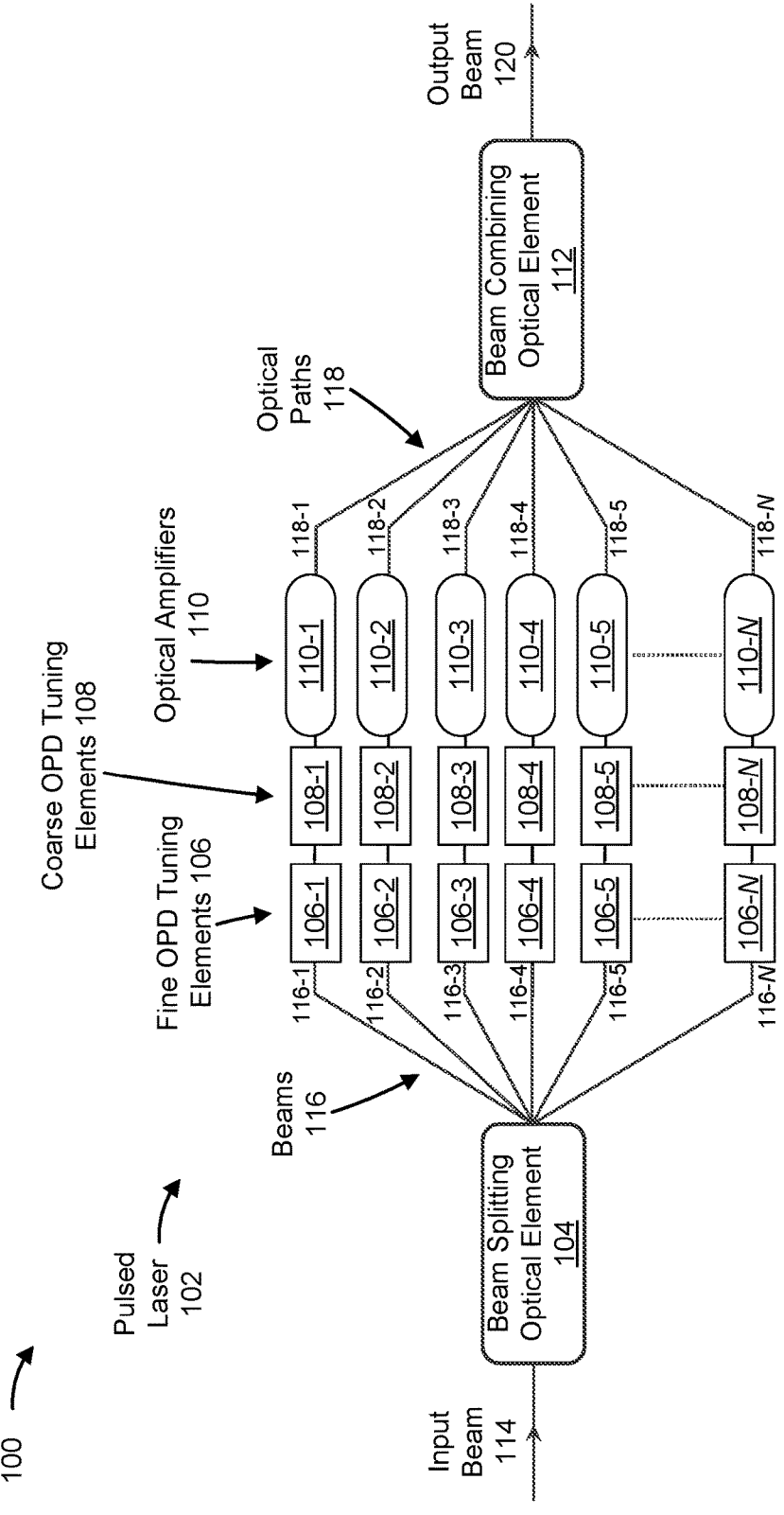
FIGS. 1A-1F are diagrams of an example associated with a tunable THz burst mode for a pulsed laser.

The following detailed description of example implementations refers to the accompanying drawings. The same reference numbers in different drawings may identify the same or similar elements.

A pulsed laser can use bursts, such as megahertz (MHz) bursts (e.g., where a minimum temporal spacing between two consecutive pulses within a burst is in the order of (some) 10 nanoseconds (ns)), to keep pulse energies/fluences low/moderate while increasing the average power of an output beam. This can be useful in material processing, where increased average power can increase material removal rate while moderate pulse-energy/fluence can maintain high process/ablation quality. However, using bursts cause heat accumulation issues in some processes, which impacts a performance of the pulsed laser with respect to these processes. Notably, in many cases, the heat deposition can be more accurately controlled by reducing the temporal spacing between individual pulses within a burst, adapting the total number of pulses within a burst and tuning the energy of individual pulses within a burst, for example lowering the pulse energy, increasing the number of pulses within the burst and reducing the temporal spacing between the pulses within the burs. Accordingly, there is a need for pulsed lasers to provide bursts with a greater than MHz frequency rate to allow for increased power processing with improved heat accumulation control.

A pulsed laser can be configured to provide a gigahertz (GHz) burst, where a minimum temporal spacing between two consecutive pulses within the burst is on the order of 1 nanosecond (ns). For example, the pulsed laser can include a laser oscillator with a GHz fundamental frequency, which allows for direct generation of a GHz burst. However, due to limitations on fundamental frequencies of laser oscillators, this technological approach cannot be used to directly generate a THz burst. In some cases, a pulsed laser can include birefringent crystals that can be stacked to create multiple pulses with small temporal spacing within a burst. This can enable generation of a THz burst, but the temporal spacing is fixed (because the temporal spacing is determined by the thicknesses of the birefringent crystals). That is, the pulsed laser is not tunable.

Some implementations described herein include a pulsed laser that supports a tunable THz burst mode (e.g., where a minimum temporal spacing between two consecutive pulses within the burst is on the order of 1 picosecond (ps)). The pulsed laser includes a beam splitting optical element, a beam combining optical element, a plurality (e.g., two or more) of optical amplifiers, and a plurality of OPD elements.

The beam splitting optical element is configured to split an input beam into a plurality of beams that are to propagate from the beam splitting optical element to the beam combining optical element via a plurality of optical paths. Each optical amplifier may be disposed on an optical path of a beam and may be configured to amplify an optical power of the beam (e.g., that propagates through the optical amplifier). Each OPD tuning element may be disposed on an optical path of a beam and may be configured to modify a length of the optical path. For example, the OPD tuning element may be a fine OPD tuning element and may be configured to modify the length of the optical path within a fine tuning range (e.g., from 0 micrometers ($\mu$m) to 5 $\mu$m). As another example, the OPD tuning element may be a coarse OPD tuning element and may be configured to modify the length of the optical path within a coarse tuning range (e.g., from 5 $\mu$m to 299 $\mu$m). In this way, the plurality of OPD tuning elements may cause the plurality of beams to propagate to the beam combining optical element at different times, wherein a temporal spacing between two consecutive times is less than or equal to 1 ps.

The beam combining optical element is configured to combine the plurality of beams into an output beam. For example, the beam splitting optical element may be configured to spatially overlap beamlets of the plurality of beams to create the output beam.

In some implementations, the pulsed laser is configured to facilitate a constructive interference condition of the plurality of beams (e.g., by controlling the lengths of the respective optical paths of the plurality of beams using the plurality of OPD tuning elements), which causes the output beam to be a single, pulsed output beam. For example, the beam combining optical element may split each beam into multiple beamlets and the pulsed laser may be configured to cause the beamlets of each beam to interfere constructively to form the output beam as a single, pulsed output beam. In this way, the pulsed laser can be configured to provide a non-burst mode.

Alternatively, in some implementations, the pulsed laser is configured to facilitate an incoherent beam combination condition of the plurality of beams, such as by controlling the lengths of the respective optical paths of the plurality of beams using the plurality of OPD tuning elements. This causes the output beam to include a plurality of pulsed beams. For example, the beam combining optical element may split each beam into multiple beamlets to form a plurality of pulsed beams, where each pulsed beam includes a beamlet of at least one beam. Notably, a particular pulsed beam, of the plurality of pulsed beams, includes a beamlet of each beam of the plurality of beams. This allows the pulsed laser to operate in a burst mode, wherein the beamlets of the particular pulsed beam are provided (e.g., serially provided) in a burst (e.g., wherein each beamlet is temporally spaced from a preceding beamlet or a following beamlet by a particular amount of time). For example, the pulsed laser may provide the beamlets in a THz burst (e.g., where an amount of time between consecutive beamlets may be less than or equal to 1 picosecond (ps)). Further, because the plurality of OPD tuning elements may be configured to finely and/or coarsely modify lengths of the optical paths of the plurality of beams, the burst is tunable. For example, the burst may be a tunable THz burst (e.g., when a fine tuning range and a coarse tuning range is from 0 to 299 $\mu$m), or may be a tunable GHz to THz burst (e.g., when a fine tuning range and a coarse tuning range is from 0 to 300 mm), among other examples.

In this way, some implementations described herein include a pulsed laser that is able to provide (e.g., in a non-burst mode) a single, pulsed output beam. Further, the pulsed laser is able to provide (e.g., in a burst mode) an output beam that includes a plurality of pulsed beams, wherein a particular pulsed beam includes beamlets that are provided (e.g., serially provided) in a burst. For example, the pulsed laser may provide the beamlets in a THz burst (e.g., where an amount of time between consecutive beamlets is less than or equal to 1 ps). Further, because the lengths of the optical paths of the plurality of beams that propagate through the pulsed laser are able to be finely and/or coarsely modified, the burst is a tunable burst, such as a tunable THz burst or a GHz to THz burst.

Accordingly, the pulsed laser can be used for practical purposes, such as material processing (e.g., where a pulsed laser that can provide bursts with a greater-than-MHz frequency rate is needed). For example, the pulsed laser can provide a burst (e.g., a THz burst) with increased average power and improved heat-load control (e.g., due to smaller or lower temporal spacing between pulses in the burst and tunable individual pulse energies). This therefore increases an efficiency of a material processing process, such as a laser ablation process.

FIGS. 1A-1F are diagrams of an example 100 associated with a tunable THz burst mode for a pulsed laser. As shown in FIGS. 1A-1F, the example 100 includes a pulsed laser 102 (e.g., a tunable pulsed burst mode laser).

As shown in FIGS. 1A-1D, the pulsed laser 102 may include a beam splitting optical element 104, a plurality of fine optical path difference (OPD) tuning elements 106 (shown as fine OPD tuning elements 106-1 through 106-N), a plurality of coarse OPD tuning elements 108 (shown as coarse OPD tuning elements 108-1 through 108-N), a plurality of optical amplifiers 110 (shown as optical amplifiers 110-1 through 110-N), and/or a beam combining optical element 112.

The beam splitting optical element 104 may be configured to split an input beam 114 into a plurality of beams 116 (e.g., a plurality of sub-beams of the input beam 114), such as N beams 116 (shown as beams 116-1 through 116-N). For example, the beam splitting optical element 104 may be configured to split the input beam 114 into a plurality of beams 116 that are to propagate from the beam splitting optical element 104 via a plurality of optical paths 118 (e.g., respective optical paths of the plurality of beams 116, shown as optical paths 118-1 through 118-N), as further described herein. The beam splitting optical element 104 may include, for example, a diffractive optical element (DOE), a segmented mirror, a conventional beam splitter (e.g., that include one or more beam splitters and/or combiners, such as partial reflectors and/or polarizing beam splitters), and/or a similar type of optical element.

Each fine OPD tuning element 106, of the plurality of fine OPD tuning elements 106, may correspond to a beam 116 of the plurality of beams 116. Accordingly, each fine OPD tuning element 106 may be disposed on an optical path 118 of a beam 116. For example, a fine OPD tuning element 106-1 may be disposed on an optical path 118-1 of a beam 116-1, a fine OPD tuning element 106-2 may be disposed on an optical path 118-2 of a beam 116-2, and so on. Each fine OPD tuning element 106 may be configured to modify a length of an optical path 118 (e.g., on which the fine OPD tuning element 106 is disposed) within a fine tuning range (this is sometimes referred to as phase delay control). The fine tuning range may be, for example, from 0 μm to 5 μm (e.g., greater than 0 μm and less than or equal to 5 μm), or another range associated with fine OPD tuning. The fine OPD tuning element 106 may be configured to modify the length of the optical path 118 (e.g., within the fine tuning range) with a resolution that is less than or equal to one tenth of a wavelength (e.g., a center wavelength) of the beam 116, one fiftieth of the wavelength of the beam 116, or one hundredth of the wavelength of the beam 116, among other examples. Accordingly, the fine OPD tuning element 106 may include, for example, a micro-electromechanical-system (MEMS) mirror, a liquid crystal on silicon (LCOS) optical element (also referred to as a spatial light modulator (SLM) or a liquid crystal modulator), a piezo-electric actuated optical element (e.g., a piezo-electric actuated mirror), an optical element with a tunable thickness (e.g., a transparent to signal wavelength optical element with a tunable thickness, such as one or more glass wedges), an optical element with a tunable refractive index (e.g., a transparent to signal wavelength optical element with a tunable refractive index, such as an electro-optic modulator optical element with a temperature dependent refractive index that may be temperature controlled using a heater or a thermoelectric cooler (TEC)), and/or a similar type of optical element.

Each coarse OPD tuning element 108, of the plurality of coarse OPD tuning elements 108, may correspond to a beam 116 of the plurality of beams 116. Accordingly, each coarse OPD tuning element 108 may be disposed on an optical path 118 of a beam 116. For example, a coarse OPD tuning element 108-1 may be disposed on the optical path 118-1 of the beam 116-1, a coarse OPD tuning element 108-2 may be disposed on the optical path 118-2 of the beam 116-2, and so on. Each coarse OPD tuning element 108 may be configured to modify a length of the optical path 118 within a coarse tuning range (this is sometimes referred to as group delay control). The coarse tuning range may be, for example, from 5 μm to 299 μm (e.g., greater than 5 μm and less than or equal to 299 μm), or another range associated with coarse OPD tuning (e.g., from 5 μm to 500 μm, from 5 μm to 1 millimeter (mm), from 5 μm to 10 mm, from 5 μm to 100 mm, or from 5 μm to 300 mm, among other examples). The coarse OPD tuning element 108 may be configured to modify the length of the optical path 118 (e.g., within the coarse tuning range) with a resolution that is less than or equal to one tenth of a wavelength (e.g., a center wavelength) of the beam 116, one fiftieth of the wavelength of the beam 116, or one hundredth of the wavelength of the beam 116, among other examples, among other examples. Accordingly, the coarse OPD tuning element 108 may include, for example, a translation stage (e.g., a motorized translation stage or a piezo-electric translation stage, among other examples), a piezo-electric actuated optical element (e.g., a piezo-electric actuated mirror), and/or a similar type of optical element.

Each optical amplifier 110, of the plurality of optical amplifiers 110, may correspond to a beam 116 of the plurality of beams 116. Accordingly, each optical amplifier 110 may be disposed on an optical path 118 of a beam 116. For example, an optical amplifier 110-1 may be disposed on the optical path 118-1 of the beam 116-1, an optical amplifier 110-2 may be disposed on the optical path 118-2 of the beam 116-2, and so on. Each optical amplifier 110 may be configured to amplify an optical power of a beam 116 (e.g., that propagates through the optical amplifier 110). For example, the optical amplifier 110 may include a gain medium that is provided with energy by a source, such as a pump laser. The gain medium may include, for example, a glass fiber doped with rare earth ions (e.g., erbium, neodymium, ytterbium, praseodymium, or thulium), a crystal doped with rare earth ions, or a waveguide in a doped material, among other examples.

The beam combining optical element 112 may be configured to combine the plurality of beams 116 into an output beam 120. For example, the beam splitting optical element 104 may be configured to spatially overlap portions (e.g., beamlets) of the plurality of beams 116 (e.g., that propagate via the respective optical paths 118 to the beam combining optical element 112, as further described herein) to create the output beam 120. Accordingly, the beam combining optical element 112 may include, for example, a DOE, a segmented mirror, a conventional beam splitter, and/or a similar type of optical element.

Figure 1B:
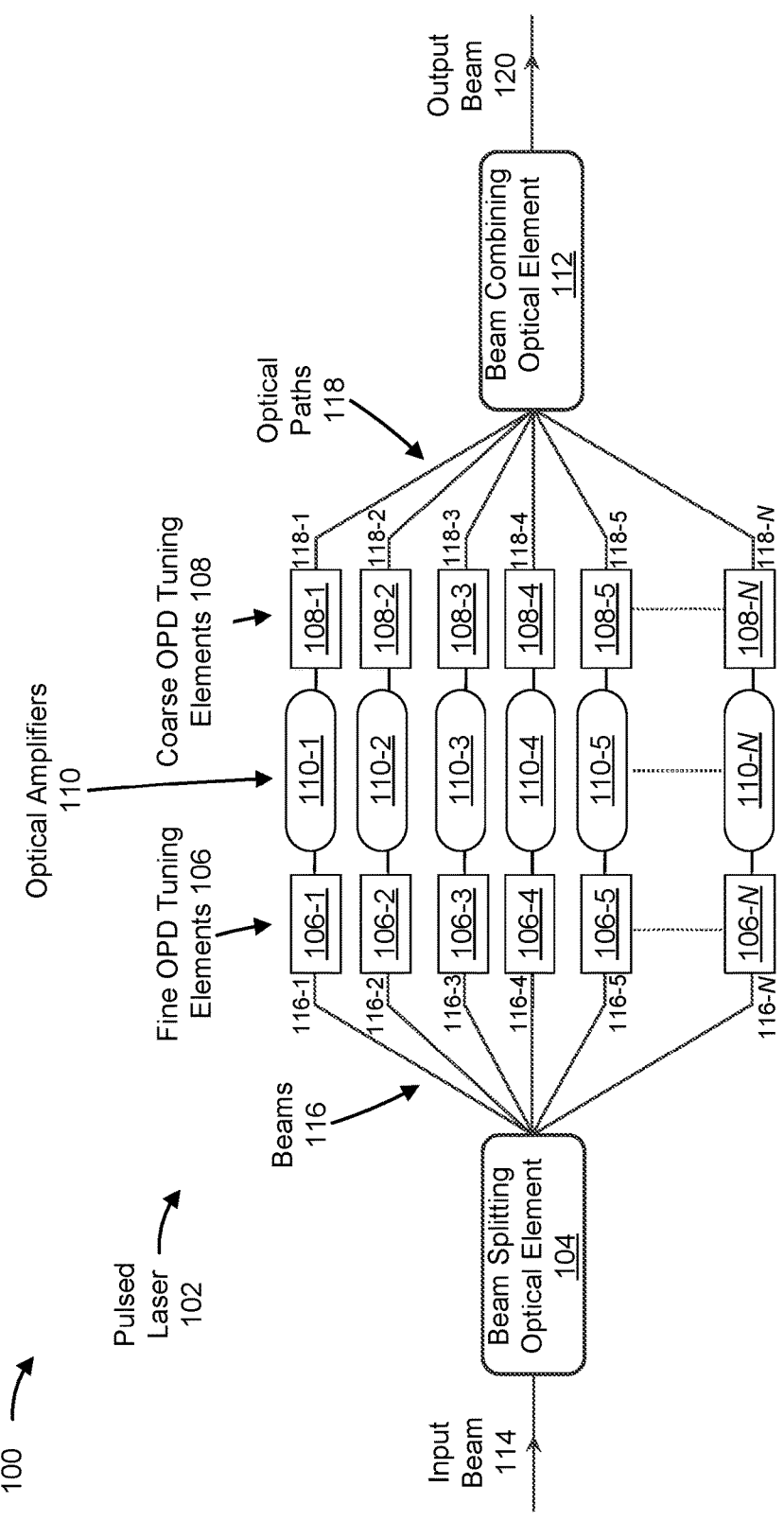
Figure 1C:
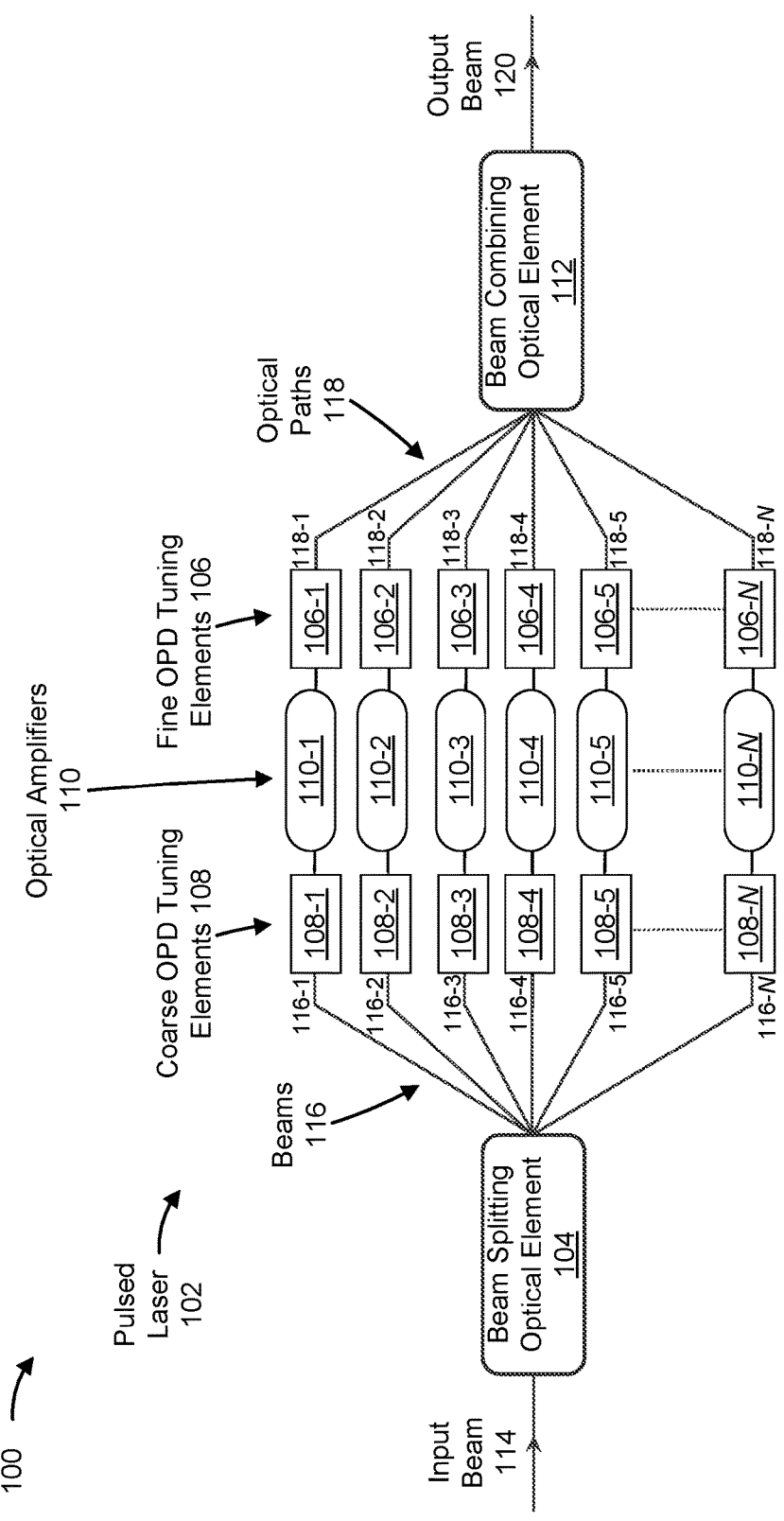
Figure 1D:
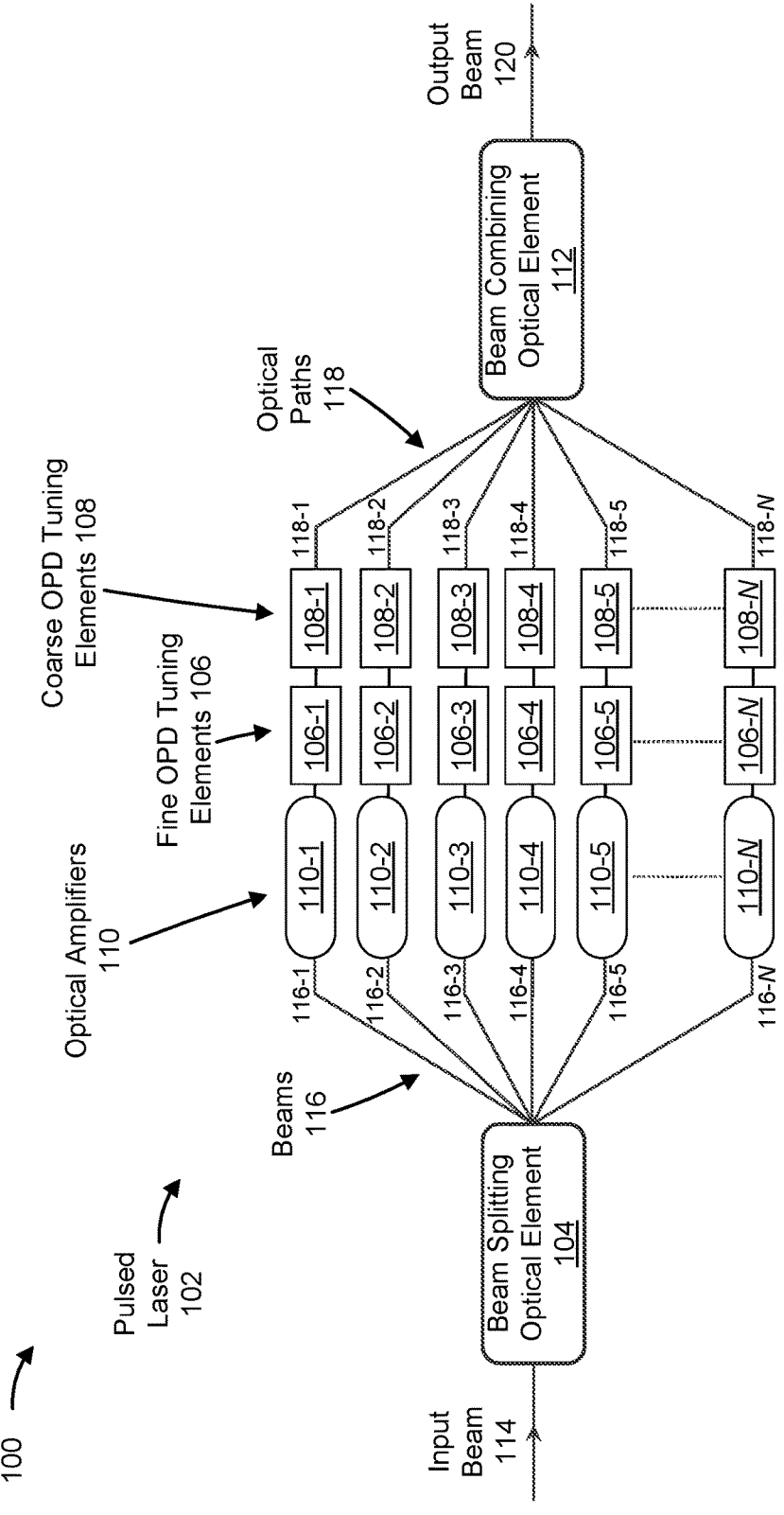
Figure 1E:
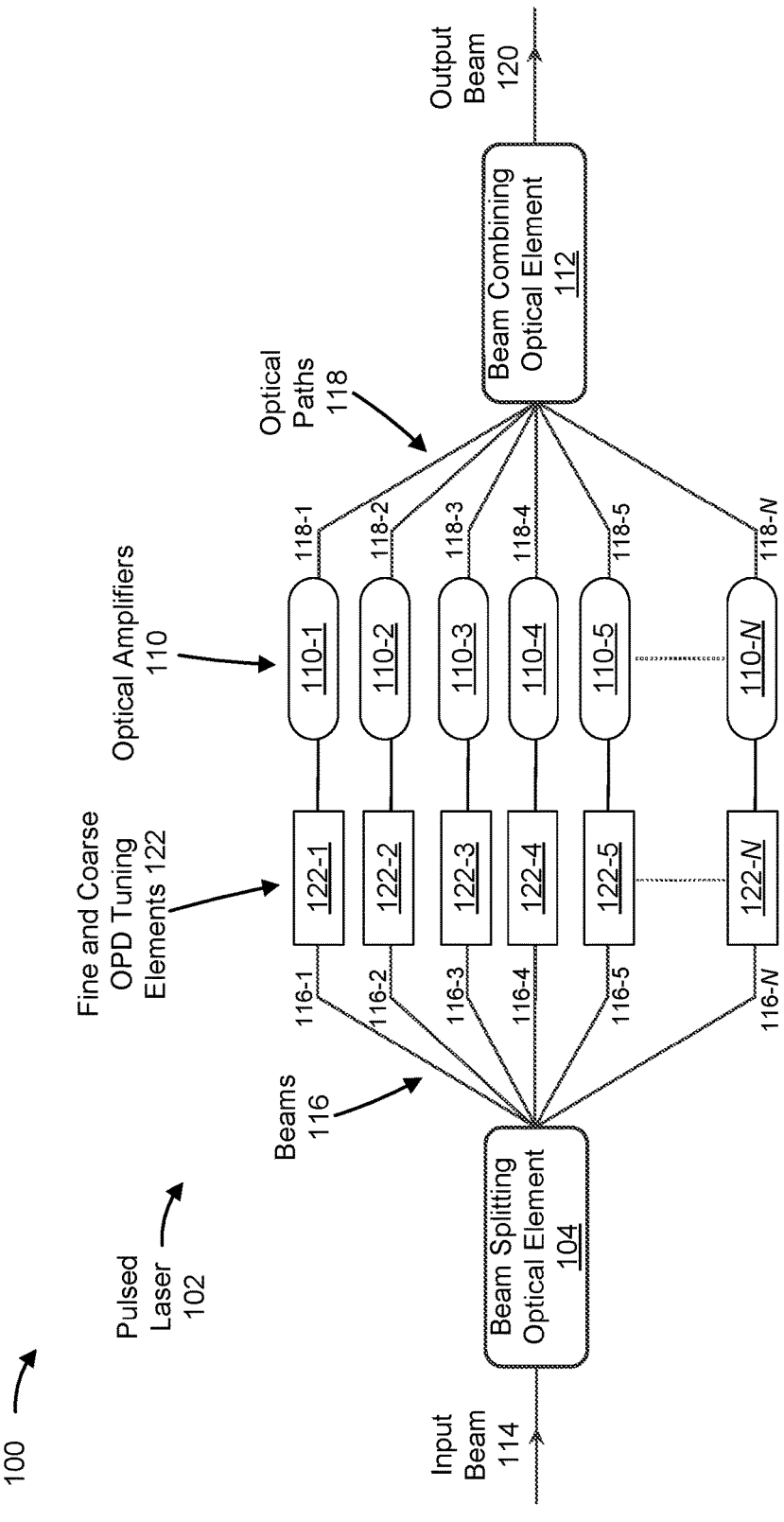
Figure 1F:
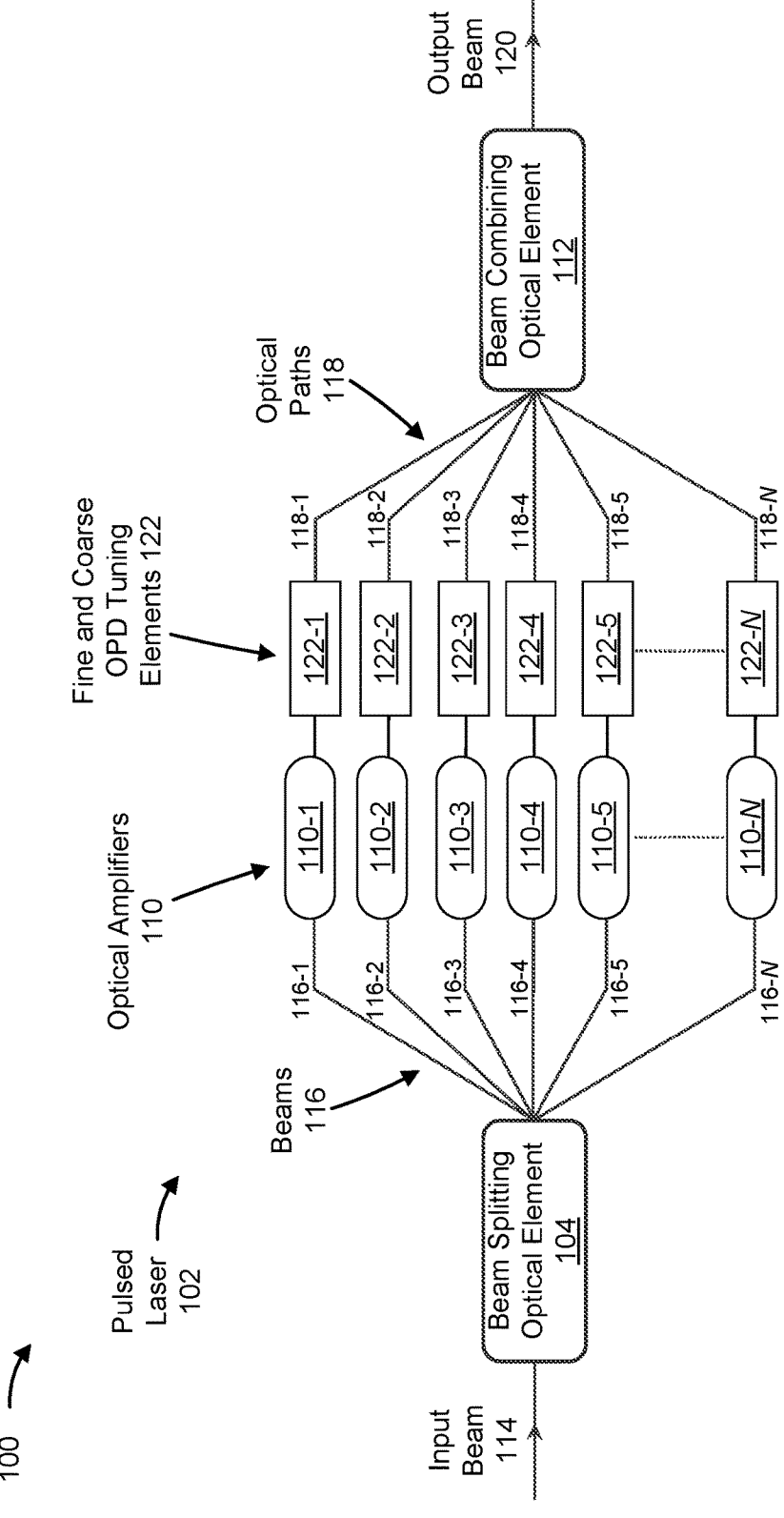

As shown in FIGS. 1E-1F, the pulsed laser 102 may include the beam splitting optical element 104, the plurality of optical amplifiers 110, the beam combining optical element 112, and/or a plurality of fine and coarse OPD tuning elements 122 (shown as fine and coarse OPD tuning elements 122-1 through 122-N) (e.g., instead of separate fine OPD tuning elements 106 and coarse OPD tuning elements 108).

Each fine and coarse OPD tuning element 122, of the plurality of fine and coarse OPD tuning elements 122, may correspond to a beam 116 of the plurality of beams 116. Accordingly, each fine and coarse OPD tuning element 122 may be disposed on an optical path 118 of a beam 116. For example, a fine and coarse OPD tuning element 122-1 may be disposed on the optical path 118-1 of the beam 116-1, a fine and coarse OPD tuning element 122-2 may be disposed on the optical path 118-2 of the beam 116-2, and so on. Each fine and coarse OPD tuning element 122 may be configured in a same, or similar, manner as a fine OPD tuning element 106 and a coarse OPD tuning element 108. Each fine and coarse OPD tuning element 122 may be configured to modify a length of the optical path 118 within a fine and coarse tuning range (this is sometimes referred to as phase delay and group delay control). The fine and coarse tuning range may be, for example, from 0 μm to 299 μm (e.g., greater than 0 μm and less than or equal to 299 μm), or another range associated with fine and coarse OPD tuning (e.g., from 0 μm to 500 μm, from 0 μm to 1 millimeter (mm), from 0 μm to 10 mm, from 0 μm to 100 mm, or from 0 μm to 300 mm, among other examples). The fine and coarse OPD tuning element 122 may be configured to modify the length of the optical path 118 (e.g., within the fine tuning range) with a resolution that is less than or equal to one tenth of a wavelength (e.g., a center wavelength) of the beam 116, one fiftieth of the wavelength of the beam 116, or one hundredth of the wavelength of the beam 116, among other examples. Accordingly, the fine and coarse OPD tuning element 122 may include, for example, a MEMS mirror, an LCOS optical element, a piezo-electric actuated optical element, an optical element with a tunable, an optical element with a tunable refractive index, a translation stage, and/or a similar type of optical element.

As shown in FIGS. 1A-1F, a fine OPD tuning element 106, a coarse OPD tuning element 108, an optical amplifier 110, and/or a fine and coarse OPD tuning element 122 may be disposed on each optical path 118 of the plurality of beams 116. Accordingly, a beam 116, when propagating on an optical path 118 from the beam splitting optical element 104 to the beam combining optical element 112, may propagate to and from at least one of a fine OPD tuning element 106, a coarse OPD tuning element 108, an optical amplifier 110, or a fine and coarse OPD tuning element 122.

For example, as shown in FIG. 1A, for an optical path 118, a beam 116 may propagate to a fine OPD tuning element 106, then to a coarse OPD tuning element 108, and then to an optical amplifier 110 before propagating to the beam combining optical element 112. As another example, as shown in FIG. 1B, for an optical path 118, a beam 116 may propagate to a fine OPD tuning element 106, then to an optical amplifier 110, and then to a coarse OPD tuning element 108 before propagating to the beam combining optical element 112. In another example, as shown in FIG. 1C, for an optical path 118, a beam 116 may propagate to a coarse OPD tuning element 108, then to an optical amplifier 110, and then to a fine OPD tuning element 106 before propagating to the beam combining optical element 112. In an additional example, as shown in FIG. 1D, for an optical path 118, a beam 116 may propagate to an optical amplifier 110, then to a fine OPD tuning element 106, and then to a coarse OPD tuning element 108 before propagating to the beam combining optical element 112. As another example, as shown in FIG. 1E, for an optical path 118, a beam 116 may propagate to a fine and coarse OPD tuning element 122 and then to an optical amplifier 110 before propagating to the beam combining optical element 112. In another example, as shown in FIG. 1F, for an optical path 118, a beam 116 may propagate to an optical amplifier 110 and then to a fine and coarse OPD tuning element 122 before propagating to the beam combining optical element 112.

Accordingly, for a beam 116 that propagates from the beam splitting optical element 104 to the beam combining optical element 112 via an optical path 118, a fine OPD tuning element 106 that is disposed on the optical path 118 may finely modify a length of the optical path 118 (e.g., modify the length by an amount that is within the fine tuning range); a coarse OPD tuning element 108 that is disposed on the optical path 118 may coarsely modify the length of the optical path 118 (e.g., modify the length by an amount that is within the coarse tuning range); a fine and coarse OPD tuning element 122 that is disposed on the optical path 118 may finely and/or coarsely modify the length of the optical path 118 (e.g., modify the length by an amount that is within the fine and coarse tuning range); and/or an optical amplifier 110 that is disposed on the optical path 118 may amplify an optical power of the beam 116. In this way, the plurality of beams 116 may propagate, via respective optical paths 118, to the beam combining optical element 112 (e.g., after each beam 116 is modified by a fine OPD tuning element 106, a coarse OPD tuning element 108, an optical amplifier 110, and/or a fine and coarse OPD tuning element 122).

The beam combining optical element 112 may combine the plurality of beams 116 into the output beam 120. In some implementations, the pulsed laser 102 may be configured to facilitate a constructive interference condition of the plurality of beams 116 (e.g., by controlling the lengths of the respective optical paths 118 of the plurality of beams 116), which may cause the output beam 120 to be a single, pulsed output beam. For example, the beam combining optical element 112 may split each beam 116 (e.g., of a first quantity of beams 116, such as N beams 116 shown in FIGS. 1A-1F) into multiple beamlets (e.g., a second quantity of beamlets, such as N beamlets, not shown in FIGS. 1A-1F), and the pulsed laser 102 may be configured to cause the second quantity of beamlets of each beam 116, of the first quantity of beams 116, to interfere constructively to form the output beam 120 as a single, pulsed output beam. Accordingly, an optical power of the output beam 120 may be a sum of the optical powers of the total quantity of beamlets (e.g., $N^2$ beamlets) of the first quantity of beams 116 (e.g., N beams 116), such as after amplification of the first quantity of beams 116 by the plurality of optical amplifiers 110.

Alternatively, in some implementations, the pulsed laser 102 may be configured to facilitate an incoherent beam combination condition of the plurality of beams 116 (e.g., an incoherent sum of electric fields of the plurality of beams 116), such as by controlling the lengths of the respective optical paths 118 of the plurality of beams 116. This may cause the output beam 120 to include a plurality of pulsed beams (not shown in FIGS. 1A-1F, but described further herein). For example, the beam combining optical element 112 may split each beam 116 (e.g., of a first quantity of beams 116, such as N beams 116 shown in FIGS. 1A-1F) into multiple beamlets (a second quantity of beamlets, such as N beamlets, not shown in FIGS. 1A-1F) to form a plurality of pulsed beams (e.g., M pulsed beams, where M>N), where each pulsed beam includes a beamlet of at least one beam 116. Notably, a particular pulsed beam, of the plurality of pulsed beams, such as a central pulsed beam, may include a beamlet of each beam 116 of the plurality of beams 116. For example, the particular pulsed beam may include a third quantity of beamlets (e.g., N beamlets) respectively from the first quantity of beams 116 (e.g., the N beams 116). Accordingly, an optical power of the particular pulsed beam may be a sum of the optical powers of the third quantity of beamlets (e.g., after amplification of the first quantity of beams 116 by the plurality of optical amplifiers 110). Put another way, the optical power of the particular pulsed beam may be less than or equal to the optical power of the output beam 120 (e.g., a total optical power of the output beam 120) divided by the third quantity (e.g., divided by N).

Additionally, in some implementations, the plurality beams 116 may each have a tunable amount of energy (e.g., based on a configuration of a respective optical amplifier 110 through which the plurality of beams 116 propagate). For example, each optical amplifier 110 may be configured to tune an amplitude of a beam 116 to a particular amplitude level (e.g., by adjusting optical amplifier coupling efficiency; adjusting optical amplifier coupling alignment; and/or inducing adjustable amplifier loss, such as by including a variable attenuator and/or a variable amplifier; among other examples) Accordingly, the beam combining optical element 112 may split each beam 116 into multiple beamlets, each with a particular amount of energy, to form a plurality of pulsed beams (e.g., where each pulsed beam includes a beamlet of at least one beam 116). Accordingly, a particular pulsed beam, of the plurality of pulsed beams, such as a central pulsed beam, may include a beamlet of each beam 116 of the plurality of beams 116. The particular pulsed beam may therefore include beamlets with various amounts of energy (e.g., based on the configurations of the plurality of optical amplifiers 110).

Further, the pulsed laser 102, when configured to facilitate the incoherent beam combination condition of the plurality of beams 116, may operate in a burst mode wherein the beamlets of the particular pulsed beam are provided (e.g., serially provided) in a burst (e.g., wherein each beamlet is temporally spaced from a preceding beamlet or a following beamlet by a particular amount of time). For example, the pulsed laser 102 may provide the N beamlets in a THz burst (e.g., where an amount of time between consecutive beamlets may be less than or equal to 1 ps). Further, because the plurality of fine OPD tuning elements 106, the plurality of coarse OPD tuning elements 108, and/or the fine and coarse OPD tuning element 122 may be configured to finely and/or coarsely modify lengths of the optical paths 118 of the plurality of beams 116, the burst may be tunable. For example, the burst may be a tunable THz burst (e.g., when a fine tuning range and a coarse tuning range is from 0 to 299 µm), or may be a tunable GHz to THz burst (e.g., when a fine tuning range and a coarse tuning range is from 0 to 300 mm), among other examples.

As indicated above, FIGS. 1A-1F are provided as an example. Other examples may differ from what is described with regard to FIGS. 1A-1F.

Figure 2A:
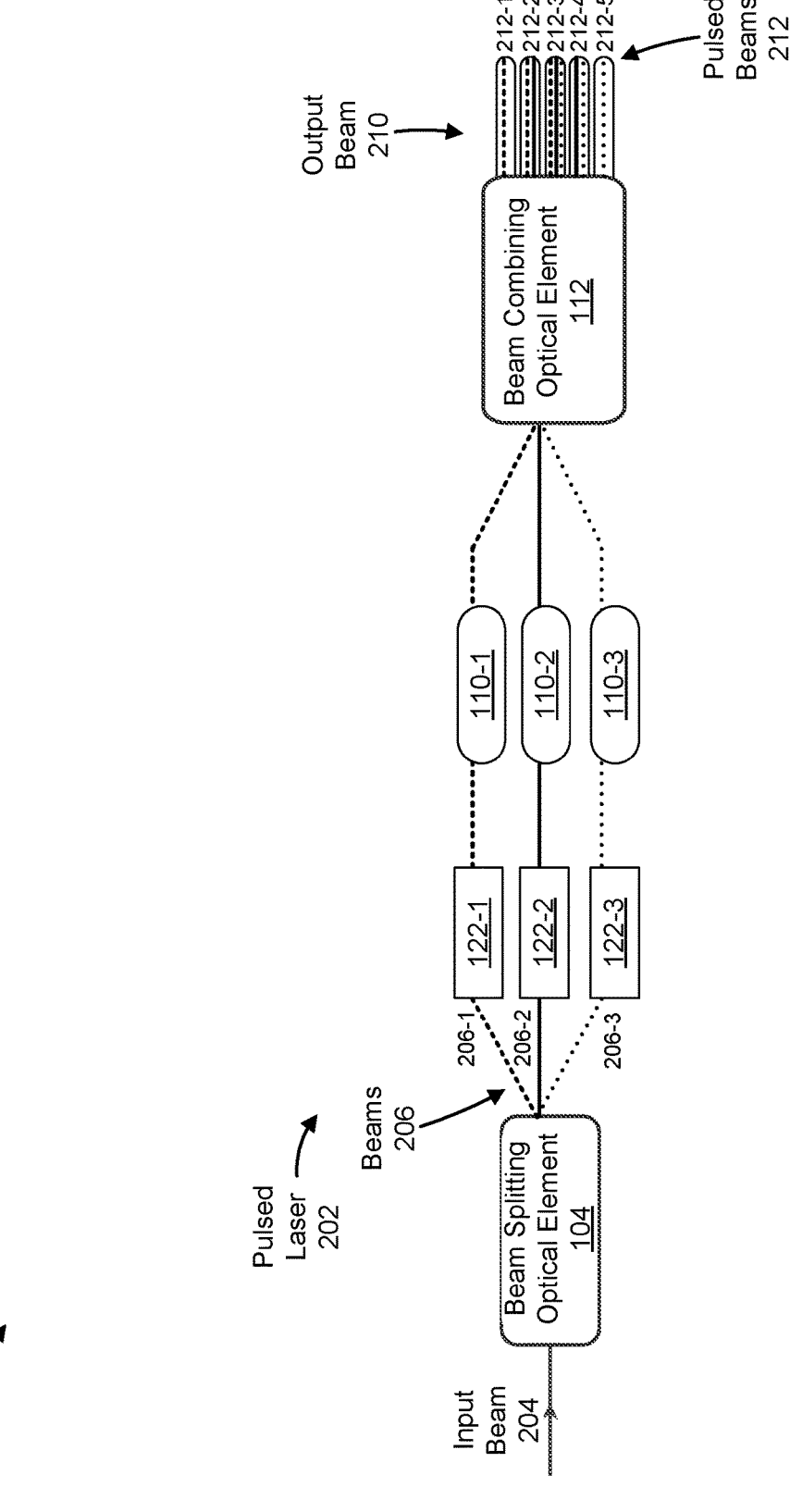
FIGS. 2A-2D are diagrams of an example associated with a tunable burst mode of a pulsed laser.
Figure 2B:
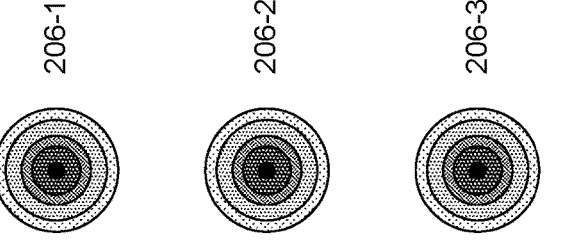
Figure 2C:
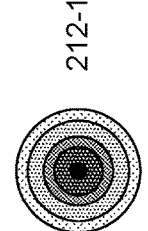
Figure 2C:
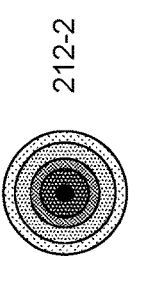
Figure 2C:
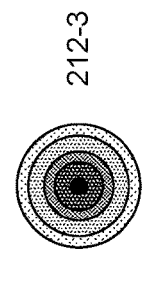
Figure 2C:
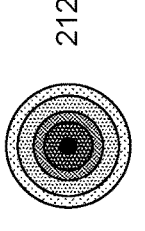
Figure 2C:
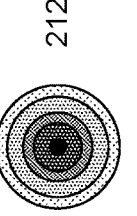
Figure 2D:
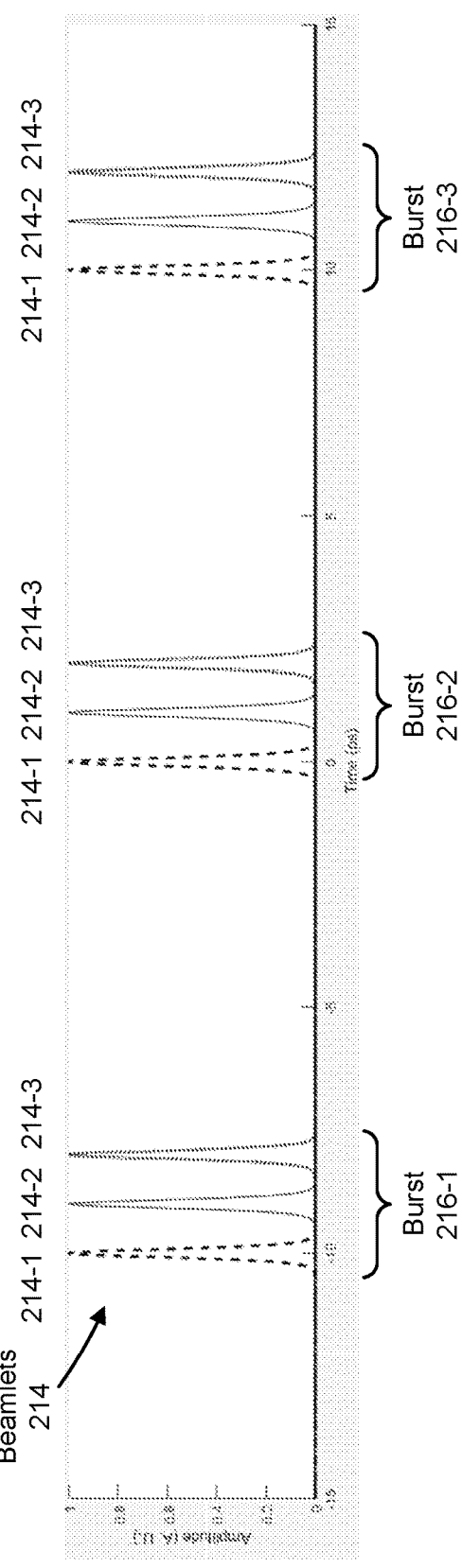

FIGS. 2A-2D are diagrams of an example 200 associated with a tunable burst mode (e.g., a tunable THz burst mode) of a pulsed laser 202 (e.g., that is configured in a same or similar manner as the pulsed laser 102 described herein in relation to FIGS. 1A-1F). FIG. 2A shows a configuration of the pulsed laser 202, FIG. 2B shows an arrangement of beams that are produced as a result of a beam splitting optical element of the pulsed laser 202 splitting an input beam; FIG. 2C shows an arrangement of pulsed beams of an output beam that is produced by a beam combining optical element of the pulsed laser 202; and FIG. 2D shows a temporal relationship between beamlets within a burst of a pulsed beam.

As shown in FIG. 2A, the pulsed laser 202 may include a beam splitting optical element 104, a plurality of fine and coarse OPD tuning elements 122 (e.g., a first fine and coarse OPD tuning element 122-1, a second fine and coarse OPD tuning element 122-2, and a third fine and coarse OPD tuning element 122-3), a plurality of optical amplifiers 110 (e.g., a first optical amplifier 110-1, a second optical amplifier 110-2, and a third optical amplifier 110-3), and a beam combining optical element 112 (e.g., that are configured in a same, or similar, manner as that described herein in relation to FIGS. 1A-1F). The beam splitting optical element 104 may be configured to split an input beam 204 into a plurality of beams 206 (e.g., a first beam 206-1, shown as a dashed line; a second beam 206-2, shown as a solid line; and a third beam 206-3, shown as a dotted line) that then propagate via a plurality of optical paths 208 (e.g., via a first optical path 208-1, a second optical path 208-2, and a third optical path 208-3, not explicitly shown in FIG. 2A) to the beam combining optical element 112.

FIG. 2B shows an example arrangement of the first beam 206-1, the second beam 206-2, and the third beam 206-3 (at a point after propagating via the plurality of optical paths 208 away from the beam splitting optical element 104). As shown in FIG. 2B, the plurality of beams may be arranged in a one-dimensional array (e.g., a vertical column), but other arrangements may be used.

Each fine and coarse OPD tuning element 122 and each optical amplifier 110 may be disposed on an optical path 208 of a beam 206. For example, the first fine and coarse OPD tuning element 122-1 and the first optical amplifier 110-1 may be disposed on the first optical path 208-1 of the first beam 206-1, the second fine and coarse OPD tuning element 122-2 and the second optical amplifier 110-2 may be disposed on the second optical path 208-2 of the second beam 206-2, and the third fine and coarse OPD tuning element 122-3 and the third optical amplifier 110-3 may be disposed on the third optical path 208-3 of the third beam 206-3. Each fine and coarse OPD tuning element 122 may be configured to modify a length of an optical path 208 of a beam 206 on which the fine and coarse OPD tuning element 122 is disposed, such as within the fine and coarse tuning range described herein in relation to FIGS. 1A-1F. Each optical amplifier 110 may be configured to amplify an optical power of a beam 206 that propagates via an optical path 208 on which the optical amplifier 110 is disposed, such as described herein in relation to FIGS. 1A-1F.

Accordingly, the plurality of beams 206 may propagate via the optical paths 208 to the beam combining optical element 112 (e.g., after each beam 206 is modified by a fine and coarse OPD tuning element 122 and an optical amplifier 110). Each beam 206 may propagate to the beam combining optical element 112 at a particular time (e.g., because the pulsed laser 202 may be configured to facilitate an incoherent beam combination condition of the plurality of beams 206, such as by controlling the lengths of the respective optical paths 208 of the plurality of beams 206 using the plurality of fine and coarse OPD tuning elements 122). For example, the first beam 206-1 may propagate to the beam combining optical element 112 at a first time, the second beam 206-2 may propagate to the beam combining optical element 112 at a second time (e.g., after the first time), and the third beam 206-3 may propagate to the beam combining optical element 112 at a third time (e.g., after the first time and the second time).

The beam combining optical element 112 may combine the plurality of beams 116 into an output beam 210. For example, the beam combining optical element 112 may split each beam 206 into multiple beamlets (e.g., three beamlets) to form a plurality of pulsed beams 212 (where each pulsed beam 212 includes a beamlet of at least one beam 206). For example, the beam combining optical element 112 may split the first beam 206-1 into three beamlets that are respectively included in a first pulsed beam 212-1, a second pulsed beam 212-2, and a third pulsed beam 212-3; may split the second beam 206-2 into three beamlets that are respectively included in the second pulsed beam 212-2, the third pulsed beam 212-3, and a fourth pulsed beam 212-4; and may split the third beam 206-3 into three beamlets that are respectively included in the third pulsed beam 212-3, the fourth pulsed beam 212-4, and the fifth pulsed beam 212-5. In this way, the first pulsed beam 212-1 may include one beamlet (e.g., a beamlet of the first beam 206-1, shown as a dashed line); the second pulsed beam 212-2 may include two beamlets (e.g., a beamlet of the first beam 206-1, shown as a dashed line, and a beamlet of the second beam 206-2, shown as a solid line); the third pulsed beam 212-3 may include three beamlets (e.g., a beamlet of the first beam 206-1, shown as dashed line; a beamlet of the second beam 206-2, shown as a solid line; and a beamlet of the third beam 206-3, shown as a dotted line); the fourth pulsed beam 212-4 may include two beamlets (e.g., a beamlet of the second beam 206-2, shown as a solid line, and a beamlet of the third beam 206-3, shown as a dotted line); and the fifth pulsed beam 212-5 may include one beamlet (e.g., a beamlet of the third beam 206-3, shown as a dotted line).

FIG. 2C shows an example arrangement of the plurality of pulsed beams 212 at a point after propagating away from the beam combining optical element 112. As shown in FIG. 2C, the first pulsed beam 212-1, the second pulsed beam 212-2, the third pulsed beam 212-3, the fourth pulsed beam 212-4, and the fifth pulsed beam 212-5 may be arranged in a one-dimensional array (e.g., a vertical column), but other arrangements may be used.

As described above, the first beam 206-1 may propagate to the beam combining optical element 112 at the first time, the second beam 206-2 may propagate to the beam combining optical element 112 at the second time, and the third beam 206-3 may propagate to the beam combining optical element 112 at the third time. Accordingly, the first pulsed beam 212-1 may be provided as a single pulse in association with the first time (because the first pulsed beam 212-1 includes a beamlet of the first beam 206-1); the second pulsed beam 212-2 may be provided as two pulses (e.g., in a burst) in association with the first time and the second time (because the second pulsed beam 212-2 includes respective beamlets of the first beam 206-1 and the second beam 206-2); the third pulsed beam 212-3 may be provided as three pulses (e.g., in a burst) in association with the first time, the second time, and the third time, (because the third pulsed beam 212-3 includes respective beamlets of the first beam 206-1, the second beam 206-2, and the third beam 206-3); the fourth pulsed beam 212-4 may be provided as two pulses (e.g., in a burst) in association with the second time and the third time (because the fourth pulsed beam 212-4 includes respective beamlets of the second beam 206-2 and the third beam 206-3); and the fifth pulsed beam 212-5 may be provided as a single pulse in association with the third time (because the fifth pulsed beam 212-5 includes a beamlet of the third beam 206-3).

Notably, the pulsed beam 212-3, may include beamlets from each of the plurality of beams 206 (e.g., in a burst). As shown in FIG. 2D, the pulsed beam 212-3 may include a plurality of beamlets 214 (e.g., a first beamlet 214-1 that is from the first beam 206-1, shown as a dashed curve; a second beamlet 214-2 that is from the second beam 206-2, shown as a solid curve; and a third beamlet 214-3 that is from the third beam 206-3, shown as a dotted curve) that are provided in multiple bursts 216 (shown as bursts 216-1 through 216-3). As shown in FIG. 2D, because the pulsed laser 202 may be configured to facilitate an incoherent beam combination condition of the plurality of beams 206 (e.g., by controlling the lengths of the respective optical paths 208 of the plurality of beams 206 using the plurality of fine and coarse OPD tuning elements 122), an amount of time between consecutive beamlets 214 within a burst 216 may be less than or equal to 1 ps, and therefore the pulsed laser 202 may be said to include a THz burst mode. While the plurality of beamlets 214 are shown as having a same, or similar, amplitude, each beamlet 214 may have a particular amplitude (e.g., based on a configuration of a corresponding optical amplifier 110), which may be different than others of the plurality of beamlets 214. Accordingly, an optical energy of the plurality of beamlets within the pulsed beam 212-3 may be said to be tunable.

Further, because the lengths of the respective optical paths 208 of the plurality of beams 206 may be modified using the plurality of fine and coarse OPD tuning elements 122, the pulsed laser 202 may be said to include a tunable THz burst mode (e.g., a burst that may be greater than or equal to a minimum, such as 1 THz, 10 THz, or 50 THz, and that may be less than a maximum, such as 100 THz, 500 THz, 1000 THz, or 3000 THz). In some implementations, the pulsed laser 202 may be said to include a tunable GHz to THz mode (e.g., a burst that may be greater than or equal to a minimum, such as 1 GHz, 100 GHz, or 500 GHz, and that may be less than a maximum, such as 100 THz, 500 THz, 1000 THz, or 3000 THz).

As indicated above, FIGS. 2A-2D are provided as an example. Other examples may differ from what is described with regard to FIGS. 2A-2D.

Figure 3A:
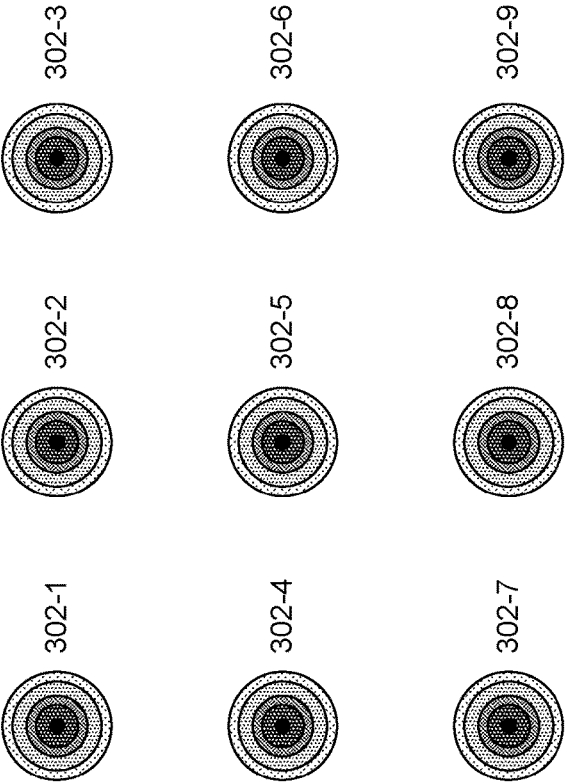
FIGS. 3A-3B are diagrams of an example associated with a tunable burst mode of a pulsed laser.
Figure 3B:
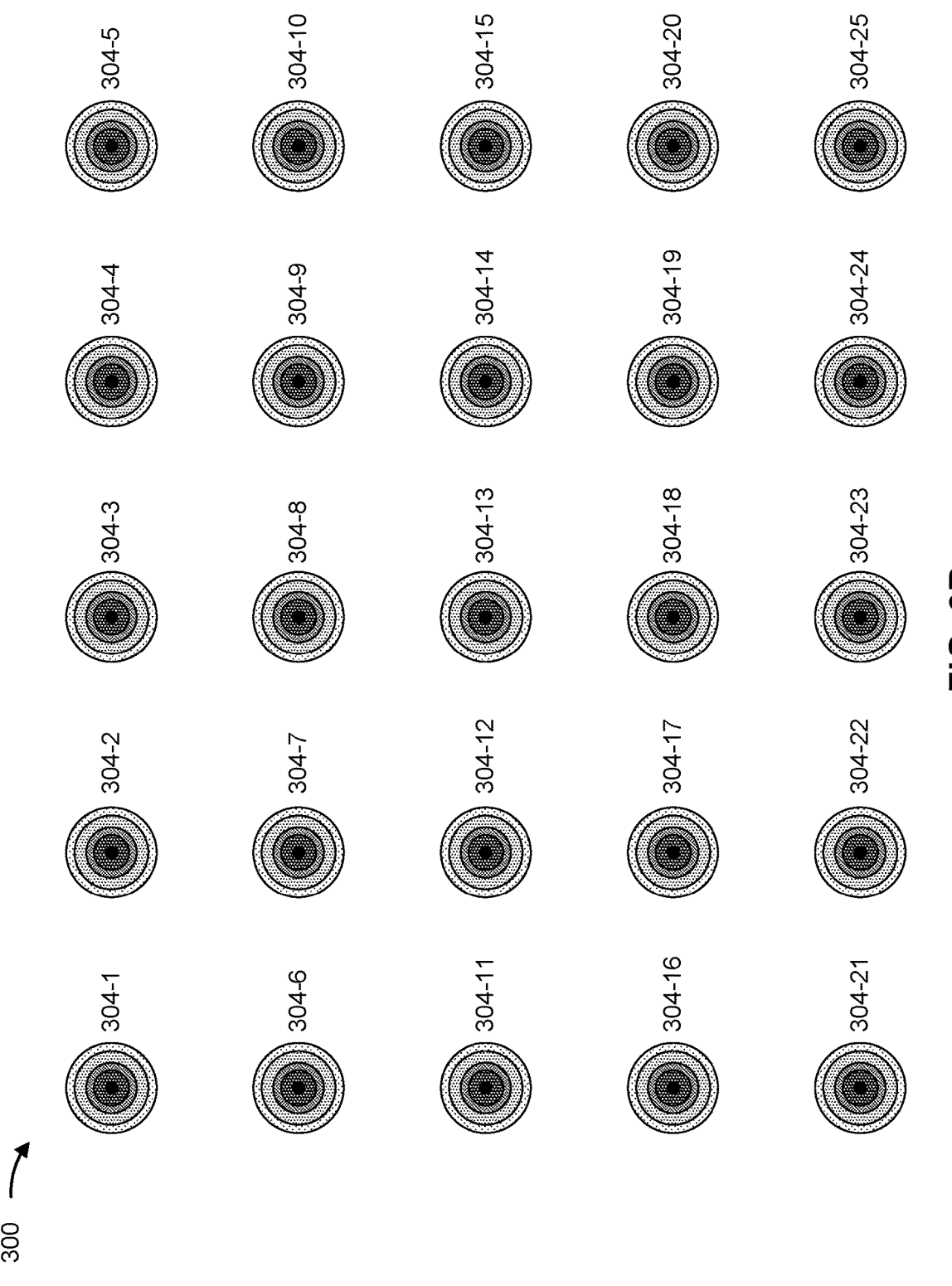

FIGS. 3A-3B are diagrams of an example 300 associated with a tunable burst mode (e.g., a tunable THz burst mode) of a pulsed laser (e.g., that is configured in a same or similar manner as the pulsed laser 102 and/or the pulsed laser 202 described herein). FIG. 3A shows an arrangement of beams 302 that are produced as a result of a beam splitting optical element of the pulsed laser splitting an input beam. FIG. 3B shows an arrangement of pulsed beams 304 of an output beam that is produced by a beam combining optical element of the pulsed laser.

FIG. 3A shows an example arrangement of the plurality of beams 302 (at a point after propagating via a plurality of optical paths away from the beam splitting optical element of the pulsed laser, such as in a similar manner as that described herein in relation to FIGS. 1A-1F and 2A-2D). As shown in FIG. 3A, the plurality of beams 302 may include a first beam 302-1 through a ninth beam 302-9. As shown in FIG. 3A, the plurality of beams 302 may be arranged in a two-dimensional array (e.g., a 3×3 square), but other arrangements may be used.

FIG. 3B shows an example arrangement of the plurality of pulsed beams 304 (e.g., of an output beam that is produced by the beam combining optical element of the pulsed laser combining the plurality of beams 302) at a point after propagating away from the beam combining optical element. As shown in FIG. 3B, the plurality of pulsed beams 304 may include a first pulsed beam 304-1 through a twenty-fifth pulsed beam 304-25. As shown in FIG. 3B, the plurality of beams 302 may be arranged in a two-dimensional array (e.g., a 5×5 square), but other arrangements may be used.

Notably, a central pulsed beam 304 of the plurality of pulsed beams 304, such as a pulsed beam 304-13, may include beamlets from each of the plurality of beams 302, such as in a burst (e.g., in a similar manner as that described elsewhere herein). Accordingly, the pulsed laser may be configured to facilitate an incoherent beam combination condition of the plurality of beams 302 (e.g., in a similar manner as that described elsewhere herein), and therefore an amount of time between consecutive beamlets of the central pulsed beam 304 (e.g., within a burst) may less than or equal to 1 ps. In this way, the pulsed laser may be said to include a THz burst mode.

As indicated above, FIGS. 3A-3B are provided as an example. Other examples may differ from what is described with regard to FIGS. 3A-3B.

Figure 4A:
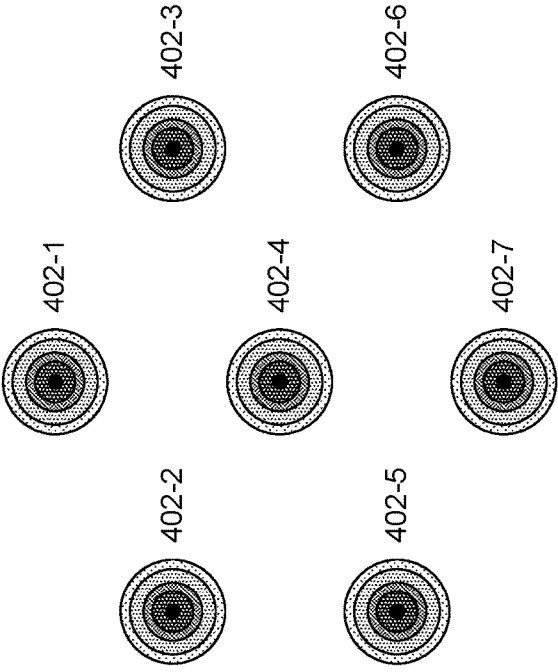
FIGS. 4A-4B are diagrams of an example associated with a tunable burst mode of a pulsed laser.
Figure 4B:
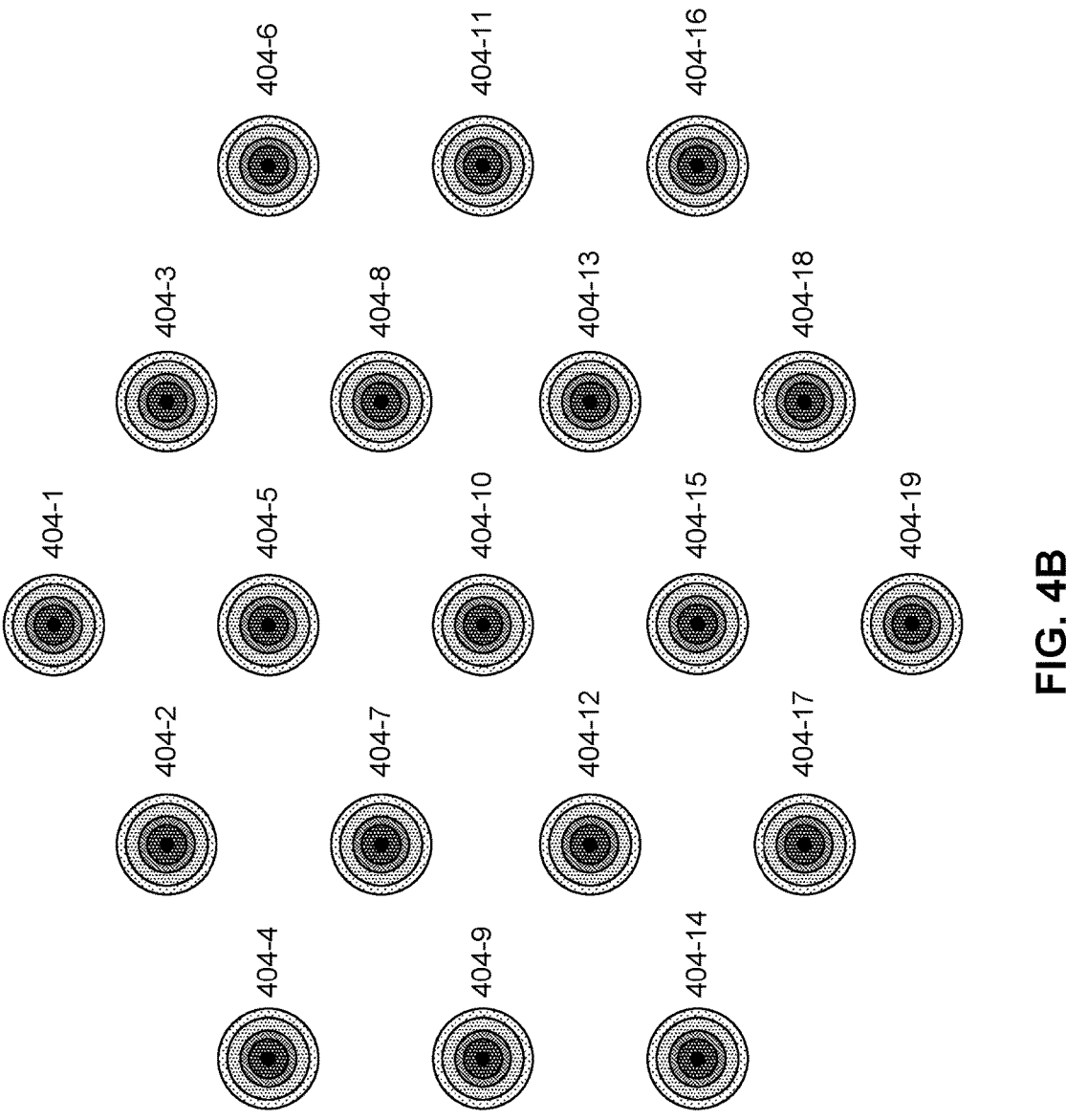

FIGS. 4A-4B are diagrams of an example 400 associated with a tunable burst mode (e.g., a tunable THz burst mode) of a pulsed laser (e.g., that is configured in a same or similar manner as the pulsed laser 102 and/or the pulsed laser 202 described herein). FIG. 4A shows an arrangement of beams 402 that are produced as a result of a beam splitting optical element of the pulsed laser splitting an input beam. FIG. 4B shows an arrangement of pulsed beams 304 of an output beam that is produced by a beam combining optical element of the pulsed laser.

FIG. 4A shows an example arrangement of the plurality of beams 402 (at a point after propagating via a plurality of optical paths away from the beam splitting optical element of the pulsed laser, such as in a similar manner as that described herein in relation to FIGS. 1A-1F and 2A-2D). As shown in FIG. 4A, the plurality of beams 402 may include a first beam 402-1 through a seventh beam 402-7. As shown in FIG. 4A, the plurality of beams 302 may be arranged in a two-dimensional array (e.g., a 7-beam hexagonal array), but other arrangements may be used.

FIG. 4B shows an example arrangement of a plurality of pulsed beams 404 (e.g., of an output beam that is produced by the beam combining optical element of the pulsed laser combining the plurality of beams 402) at a point after propagating away from the beam combining optical element. As shown in FIG. 4B, the plurality of pulsed beams 404 may include a first pulsed beam 404-1 through a nineteenth pulsed beam 404-19. As shown in FIG. 4B, the plurality of beams 402 may be arranged in a two-dimensional array (e.g., a 19-beam hexagonal array), but other arrangements may be used.

Notably, a central pulsed beam 404 of the plurality of pulsed beams 404, such as a pulsed beam 404-10, may include beamlets from each of the plurality of beams 402, such as in a burst (e.g., in a similar manner as that described elsewhere herein). Accordingly, the pulsed laser may be configured to facilitate an incoherent beam combination condition of the plurality of beams 402 (e.g., in a similar manner as that described elsewhere herein), and therefore an amount of time between consecutive beamlets of the central pulsed beam 404 (e.g., within a burst) may be less than or equal to 1 ps. In this way, the pulsed laser may be said to include a THz burst mode.

As indicated above, FIGS. 4A-4B are provided as an example. Other examples may differ from what is described with regard to FIGS. 4A-4B.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Additionally, as used herein, the term "plurality" is intended to include to two or more items, and may be used interchangeably with "two or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A tunable pulsed burst mode laser, comprising:
    a beam splitting optical element;
    a plurality of optical path difference (OPD) tuning elements;
    a plurality of optical amplifiers; and
    a beam combining optical element, wherein:
        the beam splitting optical element is configured to split an input beam into a plurality of beams that are to propagate from the beam splitting optical element to the beam combining optical element via a plurality of optical paths,
        the plurality of OPD tuning elements are respectively disposed on the plurality of optical paths and are configured to modify respective lengths of the plurality of optical paths,
        the plurality of optical amplifiers are respectively disposed on the plurality of optical paths and are configured to amplify respective optical powers of the plurality of beams, and
        the beam combining optical element is configured to combine the plurality of beams into an output beam that comprises a plurality of pulsed beams,
            wherein a particular pulsed beam, of the plurality of pulsed beams, includes a plurality of beamlets that are respectively from the plurality of beams, and
            wherein the plurality of beamlets are provided in a terahertz (THz) burst.

2. The tunable pulsed burst mode laser of claim 1, wherein the beam splitting optical element includes at least one of:
    a diffractive optical element (DOE),
    a segmented mirror, or
    a conventional beam splitter.

3. The tunable pulsed burst mode laser of claim 1, wherein the beam combining optical element includes at least one of:
    a diffractive optical element (DOE),
    a segmented mirror, or
    a conventional beam splitter.

4. The tunable pulsed burst mode laser of claim 1, wherein the plurality of OPD tuning elements includes a plurality of fine OPD tuning elements,
    wherein each fine OPD tuning element, of the plurality of fine OPD tuning elements, is configured to modify a length of an optical path, of the plurality of optical paths, within a fine tuning range from 0 micrometers (μm) to 5 μm.

5. The tunable pulsed burst mode laser of claim 4, wherein a fine OPD tuning element, of the plurality of fine OPD tuning elements, includes at least one of:
    a micro-electromechanical-system (MEMS) mirror,
    a liquid crystal on silicon (LCOS) optical element,
    a piezo-electric actuated optical element,

15 an optical element with a tunable thickness, or an optical element with a tunable refractive index.

6. The tunable pulsed burst mode laser of claim 1, wherein the plurality of OPD tuning elements includes a plurality of coarse OPD tuning elements, wherein each coarse OPD tuning element, of the plurality of coarse OPD tuning elements, is configured to modify a length of an optical path, of the plurality of optical paths, within a coarse tuning range from 5 micrometers (μm) to 299 μm.

7. The tunable pulsed burst mode laser of claim 6, wherein a coarse OPD tuning element, of the plurality of coarse OPD tuning elements, includes at least one of:

a translation stage, or a piezo-electric actuated optical element.

8. The tunable pulsed burst mode laser of claim 1, wherein the plurality of OPD tuning elements includes a plurality of fine and coarse OPD tuning elements, wherein each fine and coarse OPD tuning element, of the plurality of fine and coarse OPD tuning elements, is configured to modify a length of an optical path, of the plurality of optical paths, within a coarse tuning range from 0 micrometers (μm) to 299 μm.

9. The tunable pulsed burst mode laser of claim 8, wherein a fine and coarse OPD tuning element, of the plurality of fine and coarse OPD tuning elements, includes at least one of:

a translation stage, or a micro-electromechanical-system (MEMS) mirror, a liquid crystal on silicon (LCOS) optical element, a piezo-electric actuated optical element, an optical element with a tunable thickness, or an optical element with a tunable refractive index.

10. The tunable pulsed burst mode laser of claim 1, wherein the beam splitting optical element is configured to split the input beam into a first quantity of beams, and the beam combining optical element is configured to split each beam, of the first quantity of beams, into a second quantity of beamlets to form the output beam, wherein the first quantity is equal to the second quantity.

11. The tunable pulsed burst mode laser of claim 10, wherein the particular pulsed beam of the output beam includes a third quantity of beamlets, wherein the third quantity is equal to each of the first quantity and the second quantity.

12. The tunable pulsed burst mode laser of claim 11, wherein an optical power of the particular pulsed beam is equal to a total optical power of the output beam divided by the third quantity.

13. A tunable pulsed burst mode laser, comprising:

a beam splitting optical element;

a plurality of optical path difference (OPD) tuning elements; and a beam combining optical element, wherein:

the beam splitting optical element is configured to split an input beam into a plurality of beams that are to propagate from the beam splitting optical element to the beam combining optical element via a plurality of optical paths, the plurality of OPD tuning elements are respectively disposed on the plurality of optical paths, and

16 the beam combining optical element is configured to combine the plurality of beams into an output beam that comprises a pulsed beam that includes a plurality of beamlets that are respectively from the plurality of beams, and wherein the plurality of beamlets are provided in a burst, and wherein an amount time between consecutive beamlets within the burst is less than or equal to 1 picosecond (ps).

14. The tunable pulsed burst mode laser of claim 13, wherein the burst is a tunable terahertz (THz) burst.

15. The tunable pulsed burst mode laser of claim 13, wherein each of the beam splitting optical element and the beam combining optical element includes at least one of:

a diffractive optical element (DOE), a segmented mirror, a conventional beam splitter.

16. The tunable pulsed burst mode laser of claim 13, wherein each OPD tuning element, of the plurality of OPD tuning elements, is configured to modify a length of an optical path, of the plurality of optical paths, within a tuning range from 0 micrometers (μm) to 299 μm.

17. The tunable pulsed burst mode laser of claim 16, wherein an OPD tuning element, of the plurality of OPD tuning elements, includes at least one of:

a translation stage, or a micro-electromechanical-system (MEMS) mirror, a liquid crystal on silicon (LCOS) optical element, a piezo-electric actuated optical element, an optical element with a tunable thickness, or an optical element with a tunable refractive index.

18. A tunable pulsed burst mode laser, comprising:

a beam splitting optical element;

a plurality of optical path difference (OPD) tuning elements; and a beam combining optical element, wherein:

the beam splitting optical element is configured to split an input beam into a plurality of beams, the plurality of OPD tuning elements are respectively disposed on a plurality of optical paths of the plurality of beams, and the beam combining optical element is configured to combine the plurality of beams into an output beam that comprises a pulsed beam that includes a plurality of beamlets, and wherein the plurality of beamlets are provided in a tunable terahertz (THz) burst.

19. The tunable pulsed burst mode laser of claim 18, wherein an amount time between consecutive beamlets within the tunable THz burst is less than or equal to 1 picosecond (ps).

20. The tunable pulsed burst mode laser of claim 18, wherein each OPD tuning element, of the plurality of OPD tuning elements, is configured to modify a length of an optical path, of the plurality of optical paths, to allow an amount time between consecutive beamlets within the tunable THz burst to be less than or equal to 1 picosecond (ps).

* * * * *